(12) United States Patent  
Church et al.

(10) Patent No.: US 7,422,275 B2  
(45) Date of Patent: Sep. 9, 2008

(54) FOLDING PUSH CHAIR

(75) Inventors: Graham Church, Northampton (GB); Michael Peters, Northampton (GB)

(73) Assignee: Armon Ltd., Geneva (CH)

( * ) Notice: Subject to any disclaimer, the term of this patent is extended or adjusted under 35 U.S.C. 154(b) by 64 days.

(21) Appl. No.: 10/989,942

(22) Filed: Nov. 16, 2004

(65) Prior Publication Data

US 2005/0110308 A1    May 26, 2005

(30) Foreign Application Priority Data

Nov. 21, 2003  (GB)  ................. 0327158.2

(51) Int. Cl.
A47D 1/02  (2006.01)
B62B 7/00  (2006.01)

(52) U.S. Cl. .................. 297/16.1; 280/47.38

(58) Field of Classification Search ........... 280/642, 280/658, 650, 47.38, 647; 297/45, 42, 16.2, 297/350, 184.17, 184.13, 184.12, 184.1, 297/16.1; 403/100
See application file for complete search history.

(56) References Cited

U.S. PATENT DOCUMENTS 4,159,846 A * 7/1979 Tolleson .................. 297/162
5,474,404 A 12/1995 Chien
5,765,856 A 6/1998 Kiser
5,833,310 A * 11/1998 Labelle .................... 297/184.1
6,099,019 A 8/2000 Cheng
6,478,328 B1 11/2002 Yeh et al.
6,533,310 B2 3/2003 O'Shea .................... 280/644
2002/0014758 A1 * 2/2002 O'Shea et al. ............. 280/642

FOREIGN PATENT DOCUMENTS

| EP | 0897848 A1 | 2/1999 |
| GB | 2 278 634 | 12/1994 |
| GB | 2 363 425 | 12/2001 |
| GB | 2 380 456 | 4/2003 |

* cited by examiner

Primary Examiner—Milton Nelson, Jr.
(74) Attorney, Agent, or Firm—Andrew Wilford

(57) ABSTRACT

A foldable push chair having two side frames, each side frame having a forward strut and a rear strut attached at its uppermost end to the forward strut, and a base strut linking the rear and forward struts, wherein the forward strut has an upper section and a lower section, pivotally connected by a connection. The connection allows the upper section and lower section to pivot relative to each other, between a folded state and an unfolded state, the upper and lower sections being parallel and co-linear when the push chair is in the unfolded state.

11 Claims, 3 Drawing Sheets

FOLDING PUSH CHAIR

FIELD OF THE INVENTION

The present invention relates to push chairs for children, and in particular push chairs which can be folded for storage.

BACKGROUND OF THE INVENTION

The conventional construction of a push chair consists of two A frames linked by cross struts and having a seat located between them. Each of the two feet of each A frame has a wheel attached; one of the sloping sides of each A frame is extended at its upper end to form handle means by which the push chair can be pushed; and one of the three sides of the A frame (usually the side which extends to the handle) is hinged so that the buggy can be folded up eg. for storage. In some designs of push chair, the two A frames can also be collapsed together—this is commonly termed an umbrella fold.

SUMMARY OF THE INVENTION

According to the invention, there is provided a foldable push chair having two side frames, each side frame having a forward strut means and a rear strut means attached at its uppermost end to the forward strut means, and base strut means linking the rear and forward strut means, wherein the forward strut means comprises an upper section and a lower section, pivotally connected by connection means, the connection means allowing the upper section and lower section to pivot relative to each other, between a folded state and an unfolded state, the upper and lower sections being parallel and co-linear when the push chair is in the unfolded state.

According to another aspect of the invention, there is provided a foldable push chair having two side frames, each side frame having a forward strut means and a rear strut means attached at its uppermost end to the forward strut means, and base strut means linking the rear and forward strut means, wherein the forward strut means comprises an upper section and a lower section, pivotally connected by connection means, the connection means allowing the upper section and lower section to pivot relative to each other, between a folded state and an unfolded state, the connection means including attachment means for attachment of a hood, shade, or other accessory.

According to another aspect of the invention, there is provided a connection member for a push chair comprising an upper section and a lower section, pivotally connected by connection means, the connection means allowing the upper section and the lower section to pivot relative to each other, between a folded and an unfolded state, the upper and lower sections being parallel and co-linear when the push chair is in the unfolded state.

BRIEF DESCRIPTION OF THE DRAWINGS

A push chair embodying the invention will now be described, by way of example, without limitation to the scope of the invention, and with reference to the drawings, in which.

DESCRIPTION OF THE PREFERRED EMBODIMENT

Figure 1:
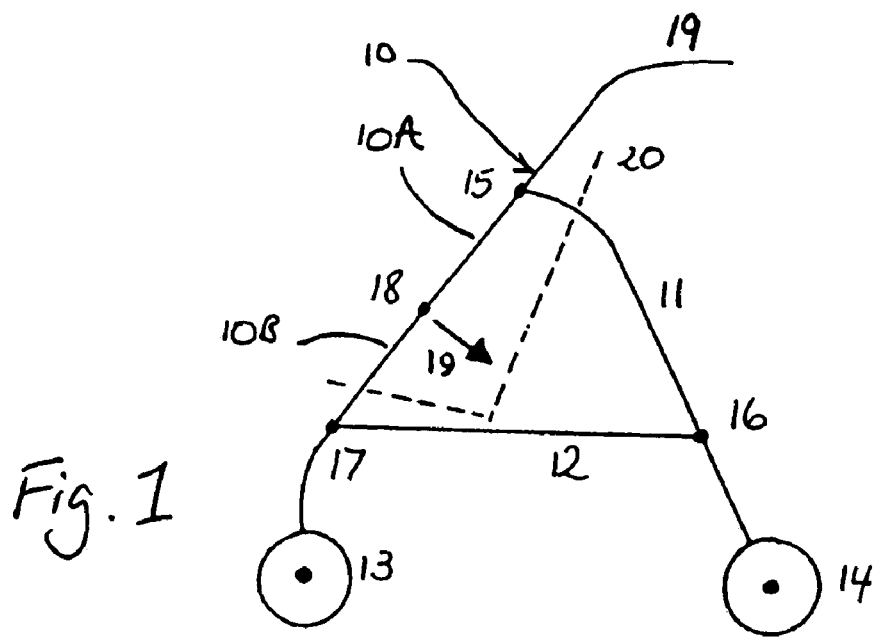
FIG. 1 is a diagrammatic side view of the main structural components of a push chair.

FIG. 1 is a simplified side view of a basic umbrella push chair, showing the A frame. The push chair comprises two A frames, one on each side, linked by cross struts. The frame can be locked in the configuration shown in FIG. 1 (the unfolded position) by means of a standard "music stand" arrangement at the rear of the push chair frame.

Each A frame consists of a front sloping bar 10, a rear sloping bar 11, and a bottom bar 12. The front and rear bars 10 and 11 have wheels 13 and 14 attached to their lower ends, as shown. The front bar 10 is also extended and curved at its upper end to provide a handle 19, which may consist of a suitable termination of the bar or of a cross-bar between the two A frames, which is able to collapse together as the push chair is folded.

The bars 10-12 are attached to each other by hinged pivots 15-17 as shown. In addition, the front bar 10 has a hinge 18 located roughly midway between the pivots 15 and 17. The front bar 10 is made up of two separate bars, the upper front bar 10A and the lower front bar 10B, which are pivotally connected by the hinge 18. When the frame is locked in the unfolded position, the hinge 18 is held in the position shown in FIG. 1, with the bar 10 straight. When the frame is folded, the upper front bar 10A and lower front bar 10B pivot about the hinge 18, allowing the front bar 10 to fold inward as indicated by arrow 19, to collapse the frame. This allows the push chair to be folded into a compact form for storage (the folded position). The cross-bars and other elements may be lockably hinged so that the push chair can be folded by having its two A frames pushed together as well as by the folding of the individual A frames.

In conventional push chairs, bars 10A and 10B are jointed in such a way that the ends of bars 10A and 10B are overlapping, resulting in the ends of the bars protruding from the frame. It is easy for clothes to become caught or snagged on the ends of the bars.

Figure 2:
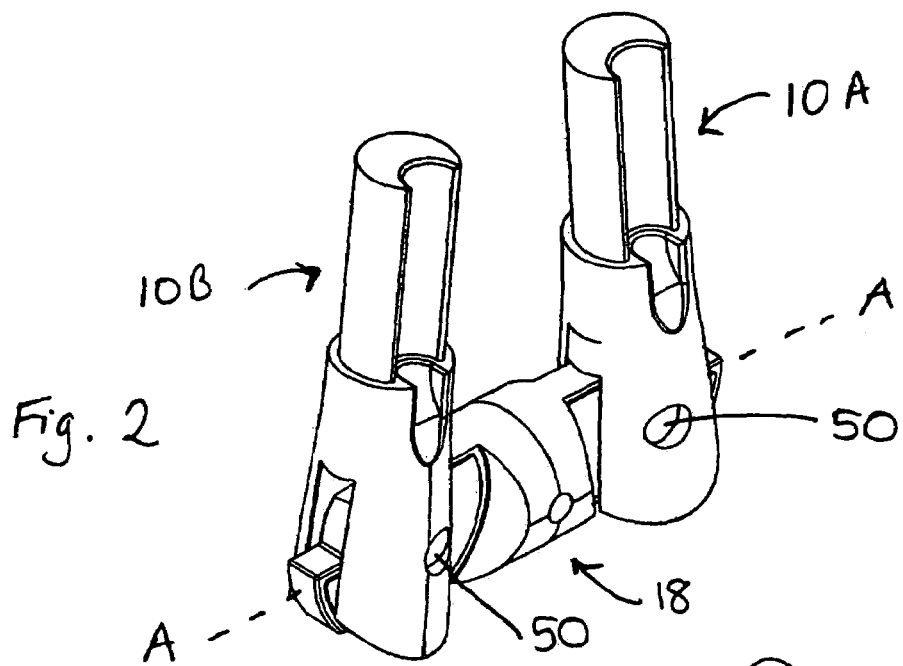
FIG. 2 shows a perspective view of the hinge assembly in the folded arrangement.

FIG. 2 shows the connection hinge 18 in the folded arrangement, for storage of the push chair. In this arrangement, the upper and lower bars, 10A and 10B, are arranged such that they are approximately at right angles to the long axis of the hinge AA and the bars are substantially parallel and adjacent to each other. In the folded arrangement, the push chair handles nestle in the push chair wheels, such that the upper and lower bars 10A and 10B are each at an angle to the axis of the hinge AA of just over 90°. In the folded arrangement, the folded seat is retained in the space between the bars 10A and 10B. The upper front bar 10A and lower front bar 10B are each pivotally connected to the hinge by pins 50.

Figure 3:
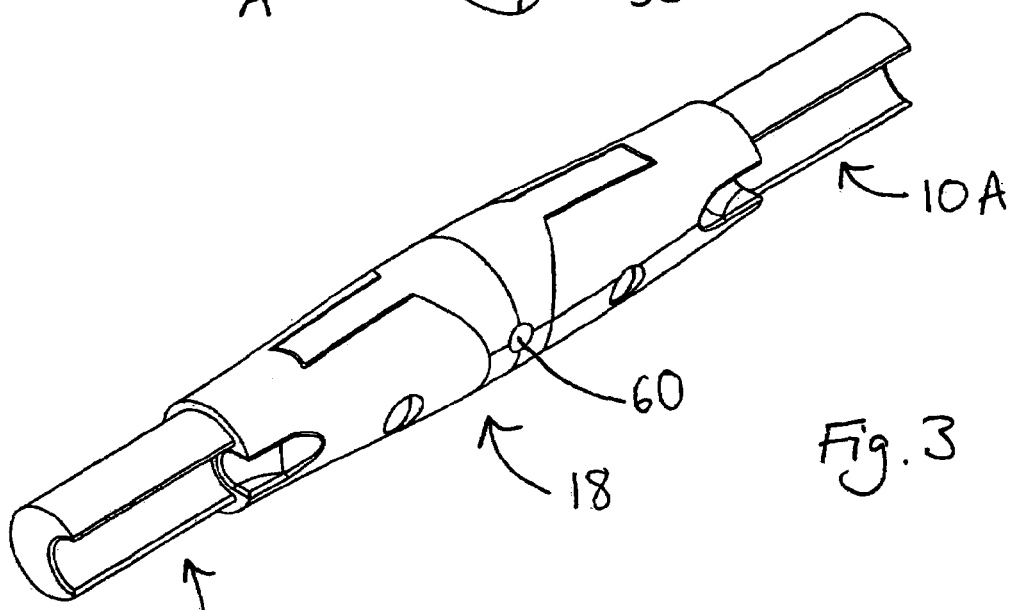
FIG. 3 shows a perspective view of the hinge assembly in the unfolded arrangement.

FIG. 3 shows the connection hinge 18 in the unfolded arrangement, for when the push chair is in use. In the unfolded arrangement the upper and lower bars, 10A and 10B, are lined up with each other, the angle between the two bars being 180°.

Figure 4:
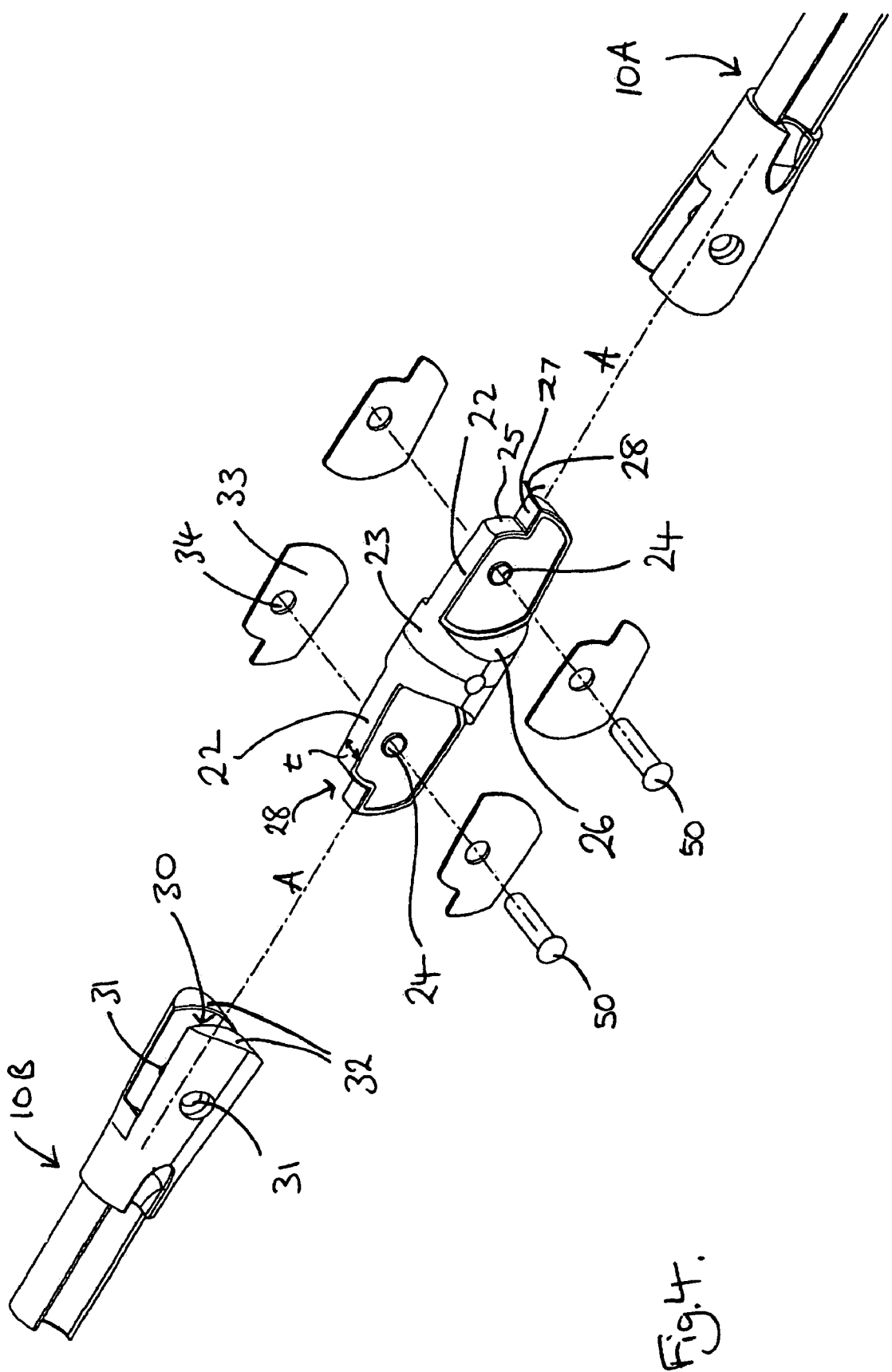
FIG. 4 shows an exploded view of the hinge assembly.

FIG. 4 shows an exploded view of the hinge assembly. The hinge body 18 comprises a central part 23 of roughly uniform circular or elliptical cross-section and two planar parts 22 extending away from the central part in opposite directions along the long axis of the hinge AA. The two planar parts 22 are of thickness t. The planar parts are arranged end to end and parallel to each other, with the central portion 23 between. The planar parts 22 extend away from the centre of each end face 26 of the central part 23. There is a hole 24 extending through each of the planar parts 22, transverse to the long axis of the hinge, through which a pin 50 is inserted to pivotally attach the bars, 10A or 10B. The end faces 26 of the central part are concavely curved surfaces, and correspond to the curved ends 32 of the bars 10A and 10B.

There is a notch 28 in the top corner of each of the planar parts 22, leaving a flat face 27, parallel with the top face of the hinge and a convexly curved portion 25, perpendicular to the top face of the hinge.

FIG. 4 shows the upper and lower bars 10A and 10B, detached from the hinge 18. There is a groove 30 in the hinge-engaging end of each bar. The width of the groove 30 is just greater than the thickness t of the planer extensions of the hinge 22, so that the planar parts 22 can be inserted in the groove 30 of each bar. There is a hole 31 in each of the groove walls. Each bar is placed on the hinge, such that the planar part of the hinge 22 rests in the groove of the bar 30 and a pin 50 is inserted through the holes 31 and hole 24, to pivotally attach each bar to the hinge, allowing each bar to pivot about its pin. Wear plates 33 are positioned between the planar parts of the hinge and the groove walls. The wear plates 33 are made of plastic and act to protect the hinge body 18 from being scratched by the groove walls, and to allow the bars to pivot more smoothly against the hinge body. Each plate is the same shape as the planar body 22 and has a hole 34, which corresponds to the hole 24 in the hinge body.

Figure 5:
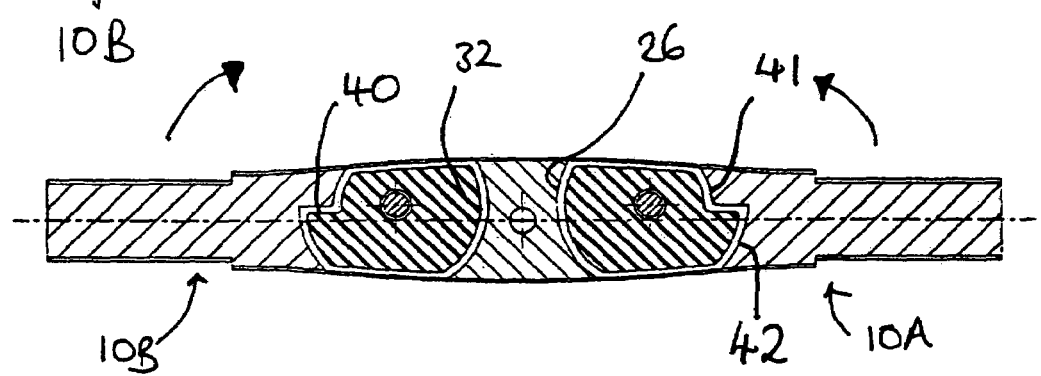
FIG. 5 shows a cross-sectional view of the hinge assembly in the unfolded arrangement.

The hinge-engaging end of the bar is rounded such that it has two convexly curved faces 32, which correspond with the concavely curved end surfaces 26 of the central part of the hinge and therefore the bars fit flush with the concavely curved surfaces 26 when the hinge assembly is in the unfolded position (see FIG. 5). When the hinge assembly is in the unfolded state, the gap between the convex faces 32 of the bars 10A and 10B and the corresponding concave surfaces 26 of the hinge is such that there is no finger trap between each bar and the hinge. The gap between the convex face 32 of bar 10A or 10B and the concave face 26 of the hinge should not be more than 5 mm, so that there is no finger trap between each bar and the hinge.

When the bars are attached to the hinge body, each bar can pivot about its pin in a single plane, thus acting like a knee joint. The bars can pivot between the folded arrangement, as shown in FIG. 2, for when the push chair is to be stored, and the unfolded arrangement, as shown in FIG. 3, for when the push chair is in use.

Referring to FIG. 5, showing the bars and hinge in the unfolded position, the bars 10A and 10B extend away from the hinge body end to end, with the central part of the hinge 23 in between. Each of the bars can pivot from the folded position, through approximately 90° to the unfolded position, but the bars are blocked from any further rotation by the notches 28 at each end of the hinge. The base of the groove 30 in the end of each bar is stepped, so that it fits flush against the notch in the end of the hinge. When the bar has been pivoted fully to the unfolded position, the stepped surface 40 of each bar engages with the flat surface of each notch 27, blocking each bar from rotating any further than 90° from the folded position. The base of the groove has two curved surfaces 41 and 42, which fit flush against the distal end of the hinge body and ensure that the bar can be pivoted smoothly from the unfolded position to the folded position and vice versa.

When the hinge is fully open, the bars 10A and 10B are aligned end to end, forming a straight line, with the hinge in between. Referring to FIG. 3, when the hinge assembly is in the unfolded position, the bars 10A and 10B each engage flush with the hinge, so that the hinge assembly has no extending open ends which clothes could get caught on and there are no finger traps between the ends of the bars and the hinge, for clothes or people's fingers to get trapped in. The hinge-engaging ends of the upper and lower front bars 10A and 10B are spaced apart from each other by the central part of the hinge 23. When the push chair is in the folded state the folded seat fabric is retained in the space formed between the two bars 10A and 10B.

Figure 6:
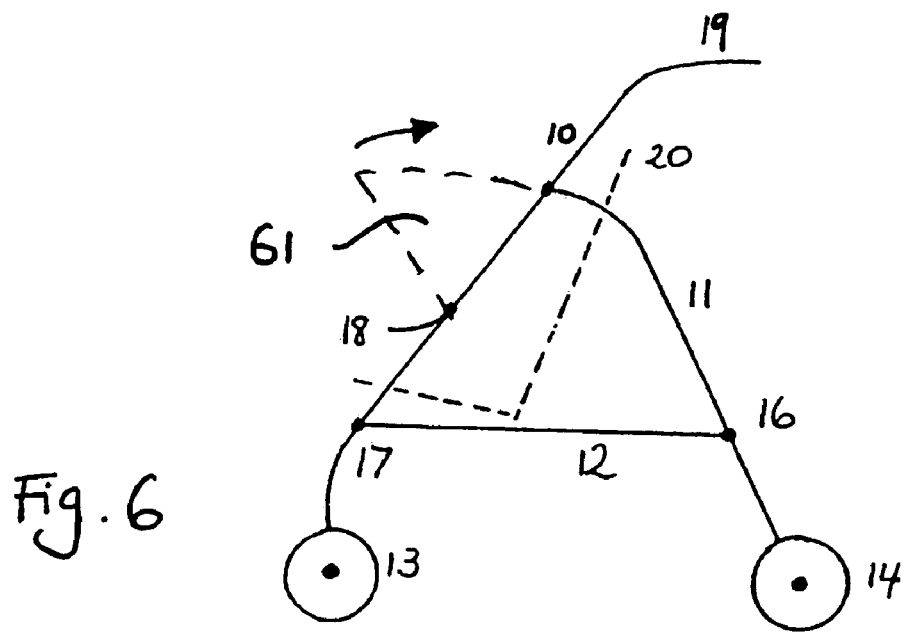
FIG. 6 is a diagrammatic side view of the a push chair with a hood attached.

Referring to FIG. 3, the central part of the hinge 23 has a hole 60 which passes through the centre of the hinge body, perpendicular to the plane of rotation of the joint. This hole can be used to attach a push chair hood to the frame. Referring to FIG. 6, showing a hood 61 attached to a push chair frame, a pin can be inserted through the hood and holes 60, to pivotally attach the bottom corners of the hood to the push chair frame. The top of the hood can be attached to the top of the seat. The hood can then be rotated between the in-use position as shown in FIG. 6, to a storage position, where it is pushed back against the seat, as shown by the arrow in FIG. 6. As the hood is pushed back against the seat, the material of the hood concertinas, so that the hood folds up and out of the way.

The foldable push chair may include a suitable locking means for locking the push chair in the unfolded state, and preventing it from collapsing when load is placed in the seat.

Although the disclosed joint has been described in relation to a push chair having an umbrella fold, it will be apparent that it can be applied to any type of push chair fold.

Alternative embodiments using the principles disclosed will suggest themselves to those skilled in the art upon studying the foregoing description and the drawings. It is intended that such alternatives are included within the scope of the invention, which is limited only by the claims.

We claim:

1. A foldable push chair having two side frames each in turn having:
   a front strut having elongated upper and lower sections having respective lower and upper ends each formed with an arcuate outer end surface;
   a central connecting part between the upper and lower ends of the lower and upper sections and having respective oppositely directed upper and lower arcuate seats complimentarily receiving the arcuate surfaces of the respective lower and upper ends and connecting the upper and lower sections together for pivoting between a folded state and an unfolded state in which the sections are generally longitudinally aligned and each of the arcuate end surfaces is spaced by a gap of not more than 5 mm from the respective seat;
   a rear strut having an upper end attached to the front strut; and
   a base strut linking the rear and front struts.

2. The foldable push chair according to claim 1 wherein the upper and lower sections each pivot through approximately 90° relative to the central connecting part between the folded state and the unfolded state.

3. The foldable push chair according to claim 1 wherein the upper section and the lower section are parallel and adjacent in the folded state.

4. The foldable push chair according to claim 1 wherein the connecting part is provided with bearing inserts disposed in the seats between the connecting part and the upper section and lower section.

5. The foldable push chair according to claim 1 wherein the connecting part has means for retaining the upper and lower sections in the unfolded state.

6. The foldable push chair according to claim 5 wherein the means for retaining comprises upper and lower abutment surfaces on the connecting part that engage with corresponding abutment surfaces on the upper section and lower section for preventing over-articulation of the upper and lower sections when in the unfolded state.

7. The foldable push chair defined in claim 1 wherein the base strut is pivoted at a lower pivots on the front strut below the connecting part and the upper end of the rear strut is pivoted at an upper pivot on the front strut above the connecting part.

8. The foldable push chair defined in claim 7 wherein the base strut is of fixed length and the connecting part is generally midway between the upper and lower pivots.

9. The foldable push chair defined in claim 1 wherein the outer surfaces of the ends of the front-strut sections are circularly arcuate and are each centered on a pivot axis substantially perpendicular to the respective section.

10. The foldable push chair defined in claim 9 wherein the seats are also circularly arcuate and centered on the respective pivot axes.

11. The foldable push chair defined in claim 10 wherein the ends and seats are formed with faces that engage each other flatly and angularly of the respective pivot axis in the unfolded state.

\* \* \* \* \*